W. W. KELLEY.
FOOTING WELLS.
APPLICATION FILED OCT. 12, 1917.
1,291,915.
Patented Jan. 21, 1919.
3 SHEETS—SHEET 1.
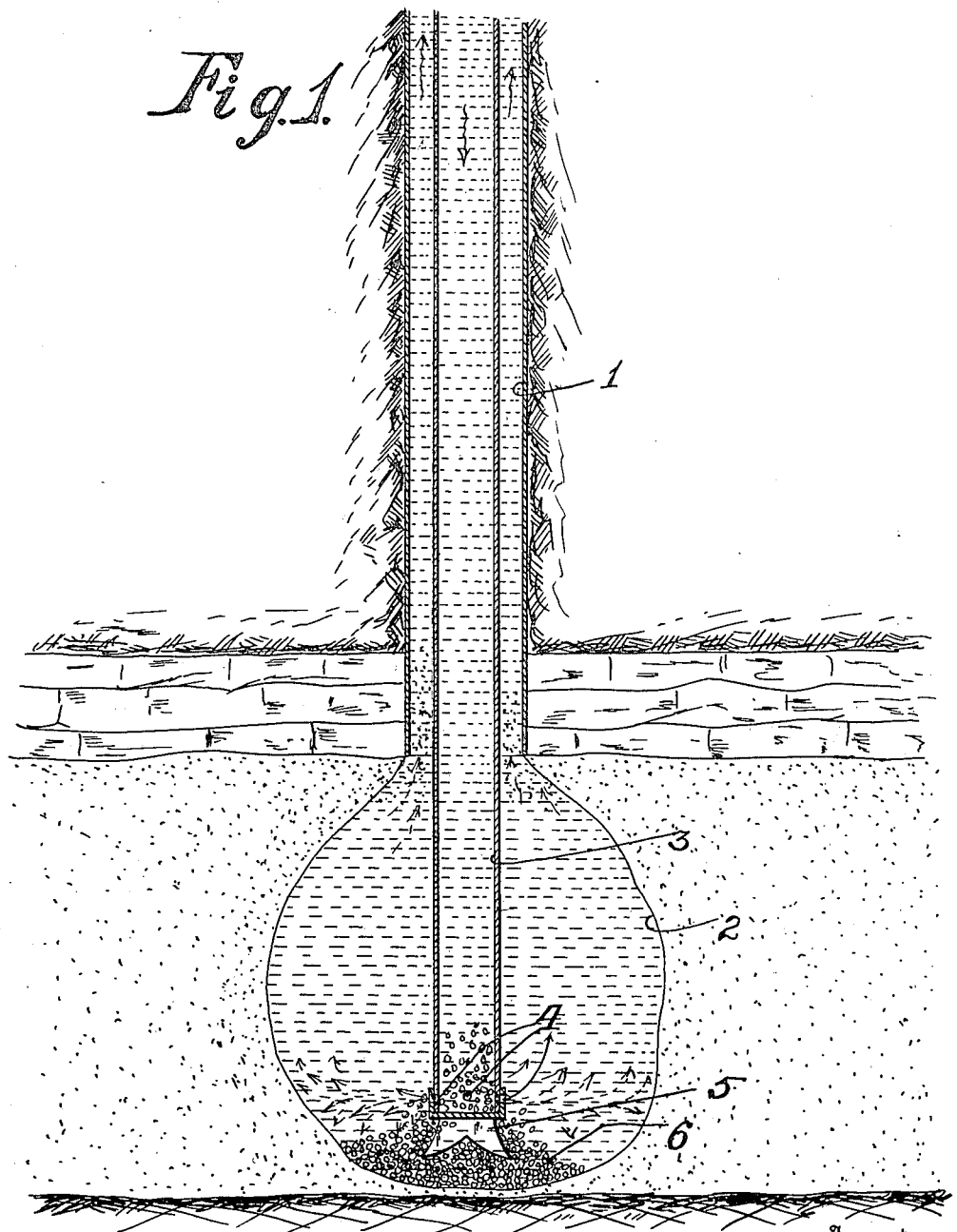

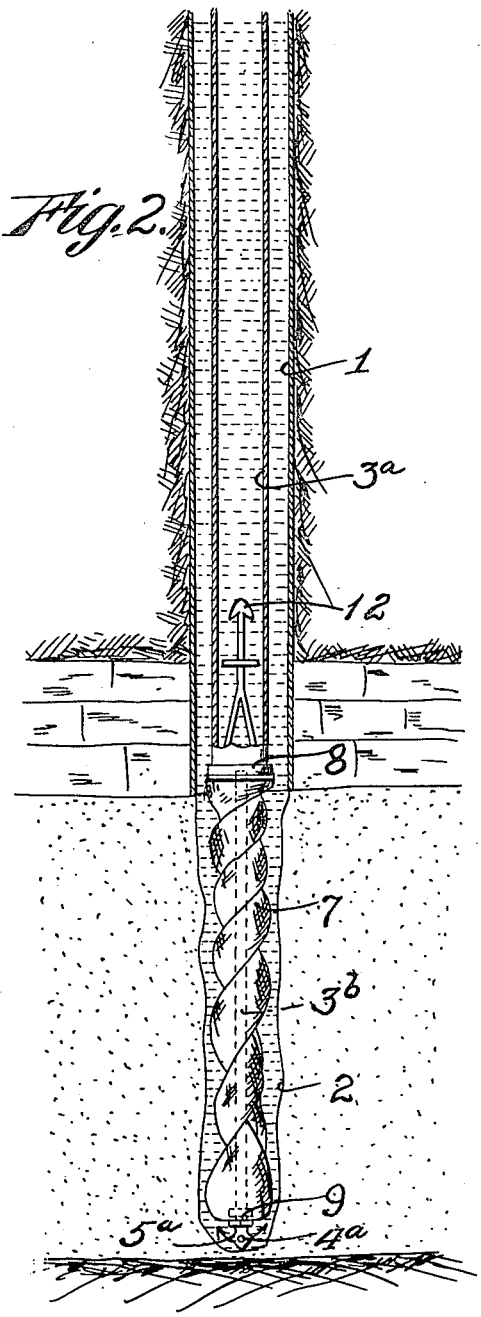
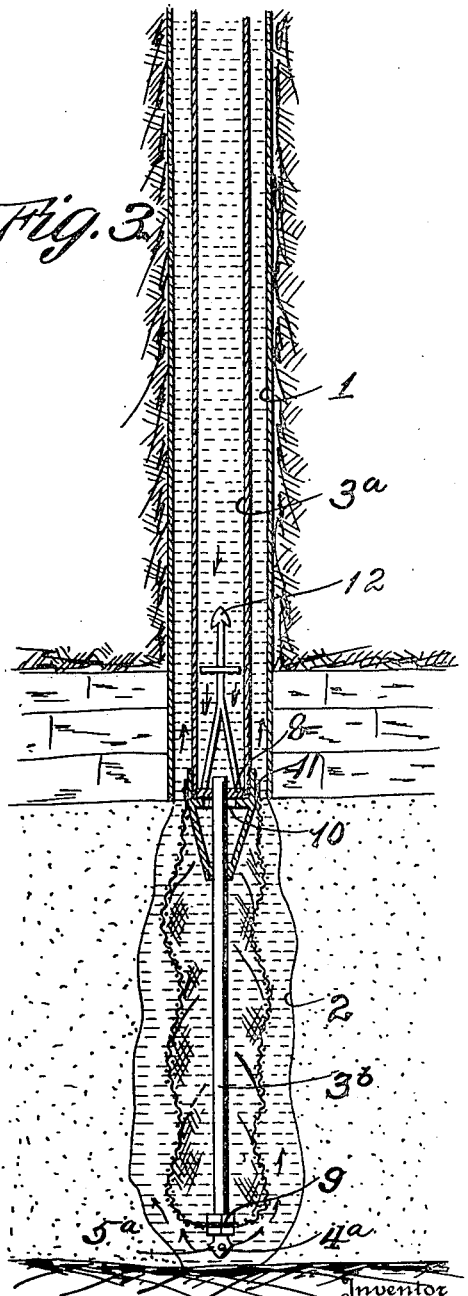

W. W. KELLEY.
FOOTING WELLS.
APPLICATION FILED OCT. 12, 1917.
1,291,915.
Patented Jan. 21, 1919.
3 SHEETS—SHEET 3.
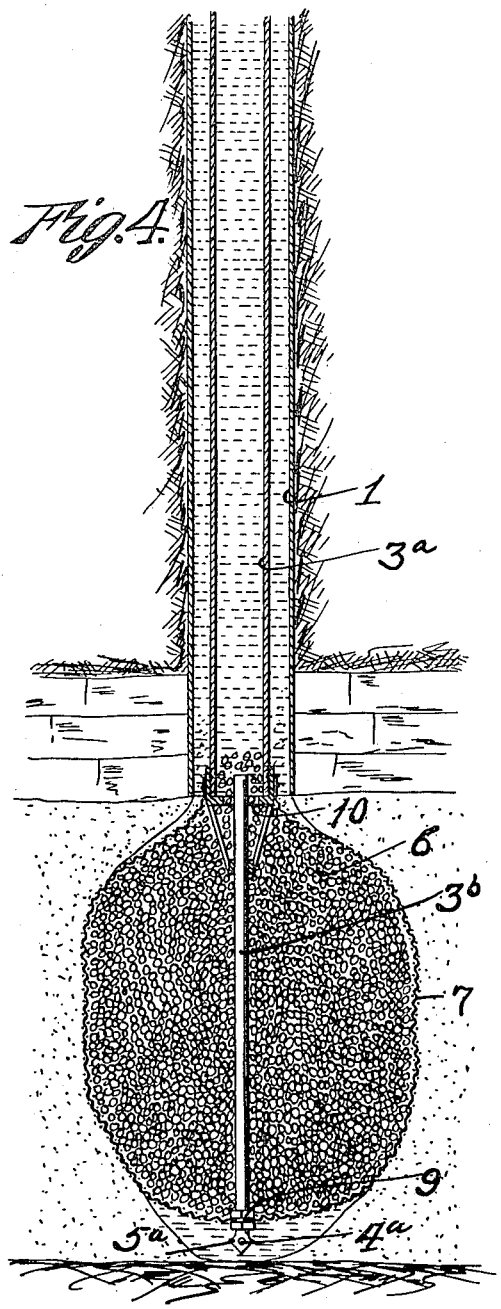
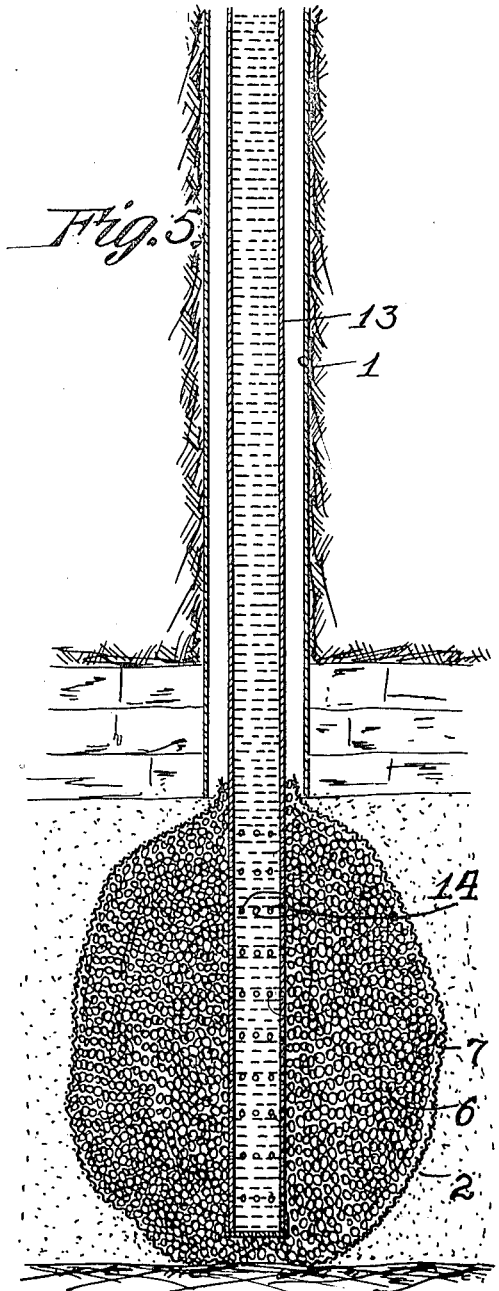

UNITED STATES PATENT OFFICE.

WARD W. KELLEY, OF LUFKIN, TEXAS.

FOOTING WELLS.

1,291,915. Specification of Letters Patent. Patented Jan. 21, 1919.

Application filed October 12, 1917. Serial No. 196,290.

*To all whom it may concern:*

Be it known that I, WARD W. KELLEY, a citizen of the United States, residing at Lufkin, in the county of Angelina and State of Texas, have invented certain new and useful Improvements in Footing Wells, of which the following is a specification.

This invention relates to a novel footing for drilled wells; also to the art of producing same and apparatus for use in connection therewith.

Heretofore in the production of deep wells it has been customary to set a screen or strainer made of metal directly into the liquid or gas bearing stratum to afford access to the pipe by which the liquid is to be withdrawn from the well. This method involves the disadvantage of accumulation of the material of the liquid bearing stratum around the intake end of the pipe which gradually reduces the capacity of flow or greatly increases the work required to draw the liquid from the well.

According to the present invention, this difficulty is met by the provision of a filtering medium around the intake end of the pipe, which medium consists of a body of, for instance, very coarse sand, fine gravel or fragments of rock too large to enter the perforations of the pipe through which the liquid is to escape, but small enough to effectually hold back the finer material of the liquid bearing stratum and keep it from reaching the perforations of the pipe; the body of filtering material, if desired, or if the material of the liquid bearing stratum is found to be moving into the well casing, i. e., heaving, being surrounded by a porous sack which prevents the material of the liquid or gas bearing stratum from mixing with or filling the interstices of the filtering medium, which the body of filtering material holds distended, said sack rendering more effective the filtration of the liquid.

In carrying out the invention, a water or a gas jet is employed for washing out and enlarging the cavity or basin in the liquid bearing stratum and washing pipe for feeding the water is also employed for conducting the filtering material into the cavity; the filtering material being supplied, if desired, as the formation of the cavity progresses. When the screening fabric is employed, means will preferably be associated with the washing pipe whereby water or gas may be communicated to the interior of the screening sack after the cavity has developed and when the sack is to be distended and the sub-divided material of the filtering body is to be introduced, means, such as a valve, being provided for excluding the distending water or gas from the interior of the fabric sack until the time for inflation, and this valve being constructed to be withdrawn by a suitable fishing tool, when desired.

After the body of filtering material is in place, the water jet pipe is withdrawn, the permanent pipe provided for outflow of the liquid is introduced and the well is ready for operation.

The apparatus employed for carrying out the invention in its simpler form may consist merely in a pipe having lateral or other suitable discharges for water jets of a size sufficient to permit escape of the sub-divided material that is to form the filtering bed. For introducing the screening sack around the body of filtering material the sack will be attached at its upper end to the lower end of the washing pipe, and at its lower end to a reduced extension on said pipe which may be readily torn away from the sack when the washing pipe is pulled, the sack being rolled or otherwise collapsed upon said extension pipe to cause it to pass without obstruction down through the well casing, and the valve for excluding water and filtering material from the interior of the sack being provided with means such as an arrow head to facilitate gripping it by the fishing tool when the time comes to withdraw said valve.

The several phases of the invention, namely, the art of producing the new footing, the construction of said footing and the apparatus used in forming the same will be fully understood upon reference to the accompanying drawings, in which:

Figure 1 is a sectional view representing the lower end of a well in which the cavity in the liquid bearing stratum is in course of completion and the sub-divided filtering material is being introduced through the water jet pipe to fill said cavity;

Fig. 2 is a sectional view of the lower end of a well in which a screening sack is collapsed upon the water jet pipe as in the act of introducing it into the liquid bearing stratum;

Fig. 3 is a view similar to Fig. 2 showing the sack partially relaxed as by uncoiling;

Fig. 4 is a view similar to Figs. 2 and 3 in which the screening sack has been distended into the cavity and filled with the filtering material by withdrawal of the temporary valve; and Fig. 5 is a view similar to Fig. 4 in which the cavity forming pipe has been removed and the pumping pipe introduced.

Referring to all the figures, 1 represents a well casing which is generally introduced as far as the cap rock which overlies the liquid bearing stratum; and 2 is the cavity formed in the oil bearing stratum.

According to Fig. 1, this cavity is formed by the water pipe 3 having jet openings 4 delivering radially therefrom, and, if desired, a drill end 5 below the jets. 6 represents a screening material entering the cavity through means of the water jet openings 4. This material is fed down through the pipe 3 and passed into the cavity during the washing out of the sand or material of the liquid bearing stratum. The filtering material will not only be coarser than the material being washed out, but it may be of much higher specific gravity, as, for instance, hematite or magnetite gravel.

According to Figs. 2 and 3 the water pipe $3^a$ is provided at its lower end with an extension $3^b$ and the sack 7 secured at 8 to the pipe $3^a$ and at 9 to the lower end of the pipe $3^b$ is suitably collapsed around the pipe $3^b$ to enable it to enter freely through the casing 1. Extension pipe $3^b$ has the water jet $4^a$ in its drill point $5^a$ and the sack is adapted to be filled through a port 10. But this port is closed at the beginning of the operation by a valve 11 resting in the lower end of pipe $3^a$ and remains closed until the cavity 2 is well formed when the valve is removed by a fishing tool that may be conveniently engaged over the arrow head 12. Upon removal of valve 11, water enters the sack 7 and distends it. The supply of water is continued and with it is introduced the sub-divided filtering material which fills the sack, the cavity being kept clear or even enlarged as this is done by the washing effect of the water. After the cavity is filled, with or without the screening sack, the water pipe with its jet is removed and replaced by a pumping pipe or liquid outlet pipe 13, the lower end of which has inlet perforations 14 as illustrated in Fig. 5.

It is to be understood that the several portions of the present invention are applicable to existing wells and also to new wells in the course of construction. In introducing the gravel or filling material, a container pipe suspended above the washing pipe will be connected with the washing pipe so that the gravel may pass into the latter while water is being supplied under pressure. Different sizes of gravel or coarse sand, or rock fragments may be used to hold back different grades of liquid or gas bearing material.

I claim:

1. The improvement in the art of footing a well, which consists in developing a collecting pocket for the liquid by introducing wash-water with a sub-divided filling material capable of resisting the wash-water and accumulating in the place of the washed-out material and holding the material of the stratum from the pipe through which the liquid is subsequently withdrawn.

2. The improvement in the art of footing wells which consists in washing the cavity in the liquid bearing stratum, supplying a filtering sack to said cavity, distending said sack by the application of washing water within the same and supplying to the interior of the sack a filtering body of sub-divided material introduced through the medium of the washing water.

3. The improvement in the art of footing wells which consists in introducing a water jet in the water bearing stratum with a porous sack surrounding the same, washing the cavity in said stratum, introducing a filtering body within the sack, withdrawing the water jet and leaving the sack surrounding the filtering body and then introducing into the filtering body a pipe adapted to withdraw the liquid of the stratum.

4. A well footing apparatus comprising a washing pipe having jet openings adapted to deliver a filtering material into a cavity or bore forming part of the well.

5. A well footing apparatus comprising a washing pipe, a screening fabric, secured around said pipe, and means for delivering a distending medium from the pipe into said screening fabric.

6. A well footing apparatus comprising a washing pipe having a valved port, a screening sack surrounding the lower end of said washing pipe and adapted to receive the distending medium through said valved port, and means through which to displace the valve of the port to admit the distending medium to the sack.

The foregoing specification signed at Houston, Texas, this 5th day of September, 1917.

WARD W. KELLEY.